Jan. 12, 1943. P. C. SYMMONS 2,308,127

NON-SCALD MIXING VALVE

Filed June 13, 1941

Inventor.
Paul C. Symmons
by Heard Smith & Tennant
Attys.

Patented Jan. 12, 1943

2,308,127

UNITED STATES PATENT OFFICE 2,308,127

NONSCALD MIXING VALVE

Paul C. Symmons, Roslindale, Mass.

Application June 13, 1941, Serial No. 397,903

9 Claims. (Cl. 277—36)

This invention relates to improvements in mixing valves for fluids under the same or relatively different pressures and temperatures and one of the objects thereof is to provide a novel valve mechanism for automatically regulating the flow of the respective fluids to cause the delivery of the mixture at a substantially uniform temperature irrespective of variations in fluid pressures of the respective liquids.

Another object of the invention is to provide a mixing valve construction of the character described with novel means for controlling the volume of fluid which is delivered at substantially the same uniform temperature.

More specifically the invention relates to improvements in mixing valves for hot and cold water under pressure, such as are utilized in connection with shower baths, bath tubs, faucets, lavatories, and other fixtures, which are so constructed that in the absence of cold water under pressure or upon failure of cold water pressure supply of hot water will be prevented or immediately discontinued, thereby providing a nonscald valve construction.

Another object of the invention is to provide a mixing valve which may be set to deliver water at a predetermined temperature and which contains an equalizing valve operable to maintain the delivery of water at the selected temperature irrespective of variations in the pressures of the hot and cold water.

A further object of the invention is to provide a valve of this character with means for controlling the volume of liquid delivered while maintaining the same at the selected uniform temperature.

These and other objects and features of the invention will more fully appear from the following description and the accompanying drawing and will be particularly pointed out in the claims.

A preferred embodiment of the invention is illustrated in the accompanying drawing, in which, Fig. 1 is a longitudinal sectional view through the valve body, the valves contained therein, and the mechanism for actuating the valve, and showing the main valve and equalizing valve in closed position;

Figure 1:
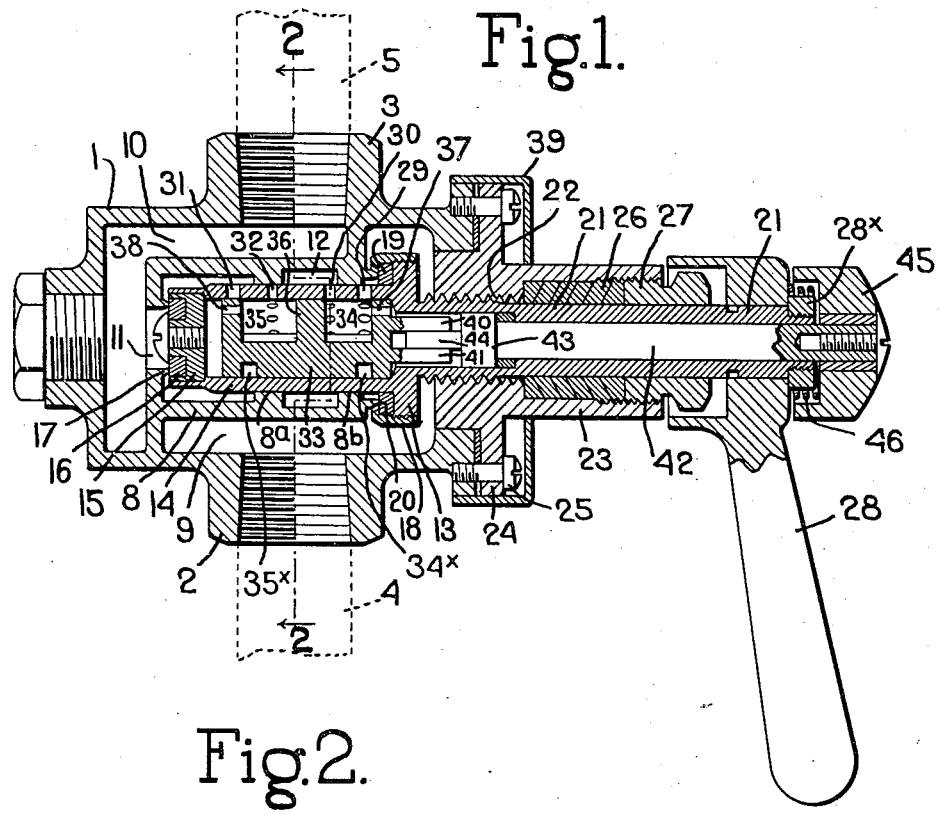
Figure 2:
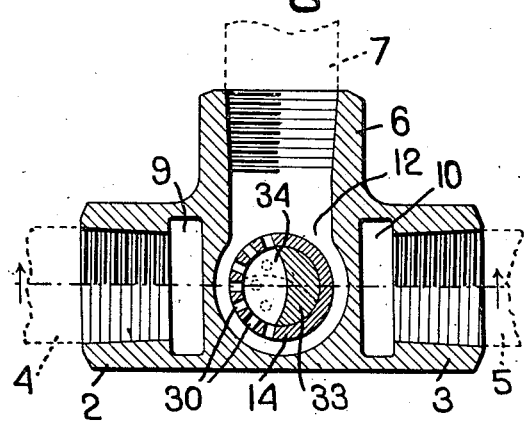
Fig. 2 is a vertical transverse sectional view on line 2—2 Fig. 1.

The preferred embodiment of the invention illustrated in Fig. 1 comprises a valve body 1, which may be in the form of a cored casting, having preferably oppositely disposed internally screw threaded bosses 2 and 3 adapted to be connected respectively to pipes 4 and 5 supplying respectively hot and cold fluids, and a preferably internally screw threaded boss 6 extending at right angles to the axis of the bosses 2 and 3 adapted to be connected to a suitable delivery pipe 7 for the mixed fluids. The valve body is provided with a preferably cylindrical valve casing 8 having a central bearing 8a and an end bearing 8b for the valve and an inlet passage 9 which communicates with the pipe 4 partially surrounds and encloses the right hand end of the valve casing. An inlet passage 10 for the hot fluid partially encloses the valve casing and extends across the end of the valve casing which is provided with a port 11 leading to the chamber of the valve casing. A central outlet passage 12 leads from the chamber of the valve casing to the outlet pipe 7, as illustrated in Figs. 1 and 2.

A main valve member, which is reciprocably and also preferably rotatably mounted in the valve casing 8, desirably is of integral construction and comprises an enlarged head 13, a tubular preferably cylindrical section 14 having a reduced end portion which is closed by a valve plug 15 having a washer 16 adapted to engage a valve seat 17 which surrounds the port 11 and forms a valve to control admission of the hot fluid to the chamber of the valve casing. The head 13 comprises a valve having an external screw thread provided with a sleeve 18 having an inwardly extending flange which engages a washer 19 adapted to engage a complementary valve seat 20 on the opposite, right hand, end of the valve casing and which is narrowly spaced from the tubular section of the valve casing.

A preferably hollow valve stem 21, which is integral with the head 13 of the valve, is provided with a screw threaded section 22 which engages complementary threads upon a preferably cylindrical fitting 23 the end of which tightly fits in a suitable aperture in the end of the valve body. Suitable means are provided for securing the fitting 23 to the valve body. As illustrated herein the fitting 23 has an annular flange 24 which is secured to the valve casing by suitable machine screws 25 and a gasket may, if desired, be interposed between the flange 24 and the end of the casing. The right hand end portion of the fitting 23 is provided with a countersink which forms a chamber to receive a suitable packing 26 and has a screw threaded end portion which is engaged by a nut 27 forming a gland to prevent leakage of fluid from the inlet passage for the cold fluid. A suitable handle 28 is mounted upon the slightly tapered portion of the valve stem 27 and may be frictionally held in tight engagement with it by a suitable nut 28x.

By virtue of the construction above described rotative movement of the handle 28 about the axis of the valve stem will cause the screw threaded connection 22 between the valve stem and fitting to move the valve member longitudinally thereby withdrawing the valve of the head.

One of the principal objects of the invention is to provide an equalizing valve responsive to the opposing pressures of the hot and cold fluid and operable to regulate the flow of the hot and cold fluids from the inlet passages therefor to the outlet passage, and a further object of the invention is to provide manually operable means for controlling the volume of fluid delivered from the outlet passage. These objects are accomplished in the present invention by providing the tubular section of the main valve member with pairs of circumferential ports one pair of which is adapted to establish communication between the cold fluid inlet passage and the outlet passage and the other pair of which is adapted to establish communication between the passage for the hot fluid and the outlet passage with an equalizing valve reciprocably mounted in the tubular section of the main valve and subject at its respective ends to the fluid pressures of the hot and cold fluids respectively, and provided with means for controlling the areas of the respective ports in such manner that increase in pressure of one of said fluids relatively to the other will restrict its flow to the outlet passage and simultaneously increase the flow of the other fluid to the outlet passage in such a manner as to maintain the mixture delivered from the outlet passage at a substantially uniform temperature. As illustrated herein the tubular valve section 14 is provided with a circumferential series of ports 29 adapted to communicate with the inlet passage 9 for the cold fluid and with a complementary circular series of preferably somewhat smaller ports 30 adapted to communicate with the outlet passage 12. The tubular valve section is also provided with a circumferential series of ports 31 adapted to communicate with the inlet passage 10 for the hot fluid and with a complementary circumferential series of preferably somewhat smaller ports 32 adapted to communicate with the outlet passage 12, as illustrated in Fig. 3.

Figure 3:
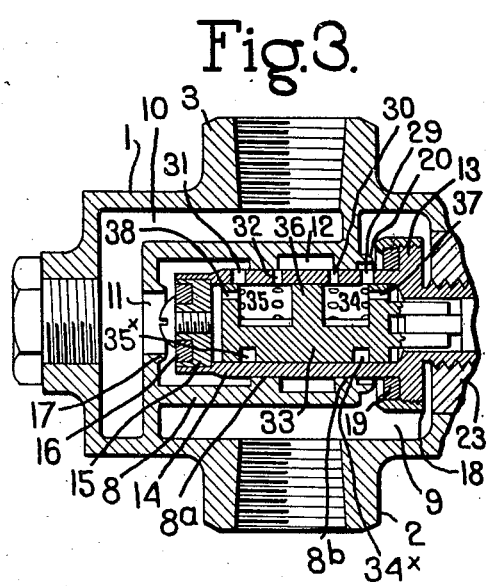
Fig. 3 is a detail longitudinal sectional view of the construction illustrated in Fig. 1 showing the main and equalizing valves in open position but omitting a portion of the valve operating mechanism shown in Fig. 1; and, Fig. 4 is a detail longitudinal sectional view of a portion of the valve body, the main valve, and a different form of equalizing valve.

The equalizing valve, as illustrated in Figs. 1 and 3, comprises a cylindrical member 33 which is reciprocably mounted in the tubular valve section 14 and is provided with suitable chambers or cup-shaped recesses 34 and 35 separated by a central wall 36, the recess 34 being adapted to establish communication between the ports 29 and 30 in the tubular section of the valve and the recess 35 to establish communication between the ports 31 and 32 in said tubular section. The equalizing valve 33 is provided with peripheral grooves 34x and 35x communicating with the respective recesses 34 and 35 so located with respect to the inner ports 29 and 31 as always to maintain equal fluid pressures in said recesses.

The end wall of the equalizing valve 33 is provided with a series of ports 37 adapted to permit the cold fluid to flow into the right hand end of the chamber of the tubular valve while the opposite end wall of the equalizing valve is provided with a series of similar ports 38 adapted to permit the hot fluid to flow into the opposite left end of the chamber of the section of the tubular valve.

By reason of this construction a preponderance of the fluid pressure of the cold fluid will move the equalizing valve to the left and similarly preponderance of fluid pressure of the hot fluid will move the equalizing valve to the right until a balance of pressure is obtained.

The equalizing valve is so constructed that in the absence of pressure upon the cold fluid the right hand end wall will be substantially in contact with the head 37 of the valve while the opposite left end wall will close the port 31 leading from the inlet passage for the hot fluid to the chamber 35, or if the equalizing valve is not in this position the entrance of hot fluid through the port 31 into the chamber 35 will instantly pass through the port 38 into the chamber at the left hand end of the valve and force the equalizing valve to the right, thereby closing the port 31. The equalizing valve will also be operated in the same way in response to failure of pressure of the cold fluid while pressure is maintained upon the hot fluid. By virtue of such action the delivery of the scalding fluid is prevented.

In the valve construction illustrated a housing 39, which encloses the flange 24 of the fitting and a complementary flange on the casing, desirably is provided with usual insignia indicating Off, Cold, Warm, and Hot (not shown).

In the operation of the invention thus far described as embodied in a non-scald hot and cold water regulating valve the handle 28 will be rotated in a direction to indicate the delivery of cold, warm or hot water as desired. Such rotation of the valve will cause the screw threaded connection between the fitting 23 and the valve stem to withdraw the head valve 13 and the end valve 15 from their respective seats, thereby permitting cold water to flow through the port 29 of the tubular valve section into the recess 34 of the equalizing valve and therefrom through the port 30 to the outlet passage. Simultaneously the end valve 15 will be withdrawn from the valve seat 17 permitting hot water to flow through the port 11 and the inlet passage surrounding the tubular valve section through the port 31 into the recess 35 of the equalizing valve and thence through the port 32 to the outlet passage 12. As the cold water is supplied to the recess 34 it will pass through the port 37 in the end wall of the equalizing valve into the right hand chamber of the tubular valve section, and simultaneously hot water will flow through the port 31 into the recess 35 of the equalizing valve and thence through the port 38 into the chamber at the opposite end of the tubular valve portion. The opposing fluid pressures of the cold and hot water will thereupon properly position the equalizing valve to deliver mixture from the outlet passage at the desired temperature. If pressure of the hot or the cold water should be decreased, as for example by increased usage of either the hot or the cold water, the fluid pressures upon the ends of the equalizing valve will be correspondingly varied and the valve moved to a position in which the delivery of hot and cold water respectively will be properly proportioned to maintain the mixture delivered from the outlet passage at the same uniform temperature.

In the construction illustrated in Figs. 1, 2, and 3, manually operable means are provided for controlling the volume of fluid delivered without substantially modifying the uniform temperature of the fluid which is to be delivered and without the necessity of manipulating the handle of the main valve.

It has heretofore been stated that the ports 29, 30, 31, and 32 are preferably arranged in a circular series and that the equalizing valve 33 is provided with recesses 34 and 35 which communicate with the inlet and outlet ports of the tubular valve section. Such recesses desirably are of the half-moon construction, as illustrated in Fig. 2, and of such size and so proportioned that when the valve is in one position, such as that illustrated in Fig. 2, full communication with all of the ports is provided. Upon rotation of the equalizing valve any desired number of such ports may be closed by the integral portion of the equalizing valve, for example as illustrated by the arcuate dotted line in Fig. 2.

Suitable means are provided for thus rotating the equalizing valve for controlling the volume of fluid passing through the valve. In the particular construction shown in Figs. 1 and 3, the equalizing valve 33 is provided with spaced parallel extensions 40 and 41 which extend into a countersink in the inner end portion of the valve stem 21. A manually operable equalizing valve adjusting rod 42 is rotatably mounted in the tubular valve stem 21 and is provided with a head 43 which slidably and rotatably fits the countersink and which is provided with an extension 44 which is located between and slidably engages the extensions 40 and 41 of the equalizing valve. The opposite outer end of the adjusting rod 42 has secured to it a preferably flanged head or cap 45, the flange of which encloses the nut 28x, and a spiral spring 46, which surrounds the nut 28x and is enclosed within the flange of the head 45, tends normally to withdraw the rod 42 to such position as will prevent the tongue 44 from so engaging the equalizing valve as to interfere with its free reciprocation, and also frictionally holds the head 45 to the handle 28 thereby preventing relative rotative movement between the rod 42 and the valve stem 21 if the handle is moved to adjusted position.

By reason of the construction described rotation of the head 45 will rotate the equalizing valve in such manner as to adjust the cup-shaped recess of the equalizing valve to positions in which the desired flow of fluid from the outlet will be secured.

In the operation of the valve mechanism illustrated in Figs. 1 and 3 rotation of the handle 28 in a proper direction will move the main valve longitudinally to a position to cause the valve to deliver fluid at the desired temperature. The head valve 13 and end valve 15 will be thereupon withdrawn from their respective valve seats thereby permitting hot and cold fluid to flow from the hot and cold inlet passages into the respective recesses 34 and 35 of the equalizing valve and thence through the ports 30 and 32 into the outlet passage 12, and thence to the delivery pipe 5. The equalizing valve 33 will be automatically adjusted in response to the fluid pressures of the hot and cold fluids applied to its ends thereby so positioning the equalizing valve as to cause the flow of the respective fluids to be so proportioned that the mixture of the fluids delivered from the outlet passage will be maintained at the desired temperature. Any variation in the pressure of either of the fluids will move the equalizing valve longitudinally in a proper direction to maintain the fluid mixture delivered from the outlet passage at the same temperature irrespective of the variations in fluid pressure of the respective liquids. By rotarily adjusting the head 45 any desired volume of fluid may be caused to pass through the valve without substantially changing the temperature of the mixture delivered therefrom.

Figure 4:
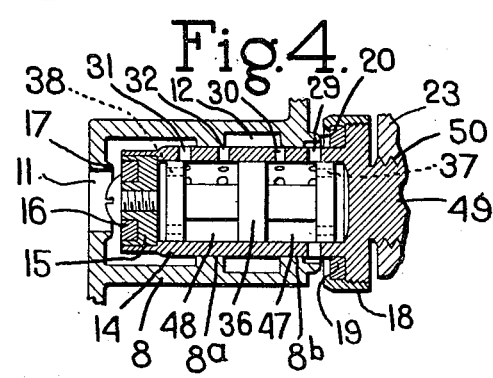

A modified embodiment of the invention, omitting the volume control, is illustrated in Fig. 4. In this construction the equalizing valve is provided with annular chambers 47 and 48 instead of cup-shaped recesses as shown in Figs. 1, 2, and 3, and the main valve is provided with an integral stem 49 having a screw threaded connection 50 with the fitting 23 instead of a tubular valve stem and the mechanism for adjusting the equalizing valve for volume control. In other respects the construction is the same as that illustrated in Figs. 1–3 and the operation of the main and equalizing valves to maintain the fluid delivered from the outlet port at a substantially uniform temperature is identical with that above described.

It will be understood that the particular embodiment of the invention shown and described herein is of an illustrative character and is not restrictive of the meaning and scope of the following claims.

Having thus described the invention, what is claimed as new and desired to be secured by Letters Patent is:

1. A mixing valve for fluids under pressure having different temperatures comprising a hollow main valve having inlet and outlet ports for the respective fluids and a pressure equalizing valve reciprocably and rotatably mounted therein having chambers adjustable to communicate with the respective fluid inlets and also with the outlet passage and provided with means for subjecting the ends of the equalizing valve to the opposing pressures of the fluids thereby causing longitudinal movement thereof so to regulate the flow of the respective fluids to the outlet passage as to maintain the fluid discharged from the outlet at a substantially uniform temperature irrespective of relative changes in the pressure of the respective fluids, and means for rotarily adjusting said equalizing valve to control the volume of fluid discharged from said outlet passage.

2. A hot and cold water mixing valve comprising a body having inlet passages respectively for hot and cold water under pressure and an outlet passage for the mixture thereof, a main valve having a cylindrical tubular section provided with circumferential ports for establishing communication between the hot and cold water passages with the outlet passage, a cylindrical equalizing valve reciprocably and rotatably mounted in said tubular section provided with cup-shaped recesses one of which is adapted adjustably to establish communication between the cold water inlet and outlet ports of said valve and the other of which is adapted adjustably to establish communication between the hot water inlet and outlet ports of said valve, and means for subjecting the ends of said equalizing valve to opposing fluid pressures of the hot and cold water thereby so to position said equalizing valve relatively to the respective inlet and outlet ports that the mixture delivered from the outlet passage will be maintained at a substantially uniform temperature irrespective of variations in the fluid pressures of the hot or of the cold water, and means for rotarily adjusting the chambers of said equalizing valve relatively to said ports as to regulate the volume of water discharged from the outlet passage.

3. A hot and cold water mixing valve comprising a body having inlet passages respectively for hot and cold water under pressure and an outlet passage for the mixture thereof and having a valve casing communicating at its ends with said inlet passages and intermediate of its ends with ports communicating with said outlet passage, a main valve member mounted in and adjustable longitudinally of said casing having valves for closing the ends of said casing and provided intermediate of said end valves with a cylindrical tubular section having ports communicable with the respective inlet passages and with the outlet passage and having a hollow valve stem, an equalizing valve slidably and rotatably mounted in said tubular section having chambers operable to establish adjustable communication between the hot water inlet ports and the cold water inlet ports with the outlet ports of said tubular section, means for subjecting the ends of said equalizing valve respectively to the fluid pressure of the hot and cold water thereby so to position the chambers of the equalizing valve relatively to the respective ports as to maintain the water discharged from said outlet passage at a substantially uniform temperature irrespective of differences in fluid pressure of the hot and cold water, and means for rotatably adjusting said equalizing valve to control the volume of water passing through said tubular valve comprising a manually rotatable member mounted in said valve stem having means connecting the same to said equalizing valve to permit free longitudinal movement of the equalizing valve.

4. A hot and cold water mixing valve comprising a body having inlet passages respectively for hot and cold water under pressure, and an outlet passage for a mixture thereof intermediate of said inlet passages, a main valve having a cylindrical tubular section provided with adjacent circumferential series of complementary ports for establishing communication respectively between the hot and cold water passages and the outlet passage, a cylindrical equalizing valve fitting and reciprocably and rotatably mounted in said cylindrical section and provided with cup-shaped recesses one of which is adapted to establish communication between the cold water inlet passage and the outlet passage and the other of which is adapted to establish communication between the hot water inlet passage and the outlet passage and provided with means for subjecting the ends of said equalizing valve to opposing pressures of the hot and cold water, thereby so to position the equalizing valve relatively to the respective inlet and outlet ports that the mixture delivered from the outlet port will be maintained at a substantially uniform temperature irrespective of variations in the fluid pressure of the hot or of the cold water and means for rotarily adjusting the equalizing valve selectively to establish communication between the respective cup-shaped recesses and a predetermined number of the complementary inlet and outlet ports of the tubular valve thereby to regulate the volume of water discharged from the outlet passage.

5. A mixing valve for fluids under pressure having different temperatures comprising a body having a cylindrically chambered valve casing provided with end ports and with inlet passages for the respective fluids communicable with the end ports of the chamber of said valve casing and an outlet passage intermediate of said inlet passages communicating with the chamber of said casing, a manually operable main valve member mounted in said valve casing and rotatably and longitudinally adjustable therein having a tubular section provided with sets of circumferential ports for establishing communication between the respective inlet passages and the outlet passage and provided at its ends with valves operable when the valve member is moved inwardly simultaneously to shut off the flow of both fluids to the tubular section of said valve member and when moved outwardly to regulate the flow of the respective fluids into said tubular section and an equalizing valve reciprocably and rotatably mounted in said tubular section having ports for the respective fluids to cause its ends to be subject to the pressures of the respective fluids and provided with recesses cooperating with the circumferential ports of said tubular section operable by the longitudinal movement of said valve in response to relative variations in the pressures of the respective fluids so to proportion the rates of flow of the respective fluids as continuously to maintain the mixed fluids delivered from the outlet passage at a substantially uniform temperature and means for rotatably adjusting said equalizing valve to increase or decrease the number of circumferential ports in the tubular section with which the respective recesses communicate thereby to vary the volume of the mixture delivered to said outlet passage.

6. A mixing valve construction, for a valve body having spaced inlet passages respectively for fluids under pressure having different temperatures and an outlet passage intermediate of said inlet passages, comprising a valve casing within said body having passages communicating respectively with the inlet passages of said body and with the intermediate outlet passage of said body, a main valve member fiting and slidably mounted in said valve casing and adjustable lengthwise thereof having closed ends and at its respective ends valves to cooperate with the respective inlet passages of said casing operable to shut off or control the admission of the respective fluids to said valve casing and having a tubular section intermediate of the ends of said valve member, the wall of which is provided with pairs of adjacent ports for establishing communication between the respective inlet passages and the outlet passage, an equalizing valve reciprocably mounted in said tubular section provided with ports for causing the ends of the equalizing valve to be subject to the pressures of the respective fluids and having recesses cooperating respectively with the pairs of adjacent ports in the wall of said tubular section operable by the lengthwise movement of said equalizing valve in response to varying pressures of the respective fluids so to regulate the flow of the respective fluids through said adjacent ports as continuously to maintain the mixture delivered from the outlet passage at a substantially uniform temperature.

7. A mixing valve for fluids under pressure having different temperatures comprising a valve body provided with inlet passages for the respective fluids and an outlet passage intermediate of said inlet passages for the mixed fluid, a cylindrical valve casing having at its ends ports communicating with the respective inlet passages, a single manually adjustable tubular main valve in said casing having closed ends and valves complementary to the end ports of said valve casing acting when closed to prevent flow of fluid from either of said inlet passages to the chamber of said tubular valve, pairs of adjacent ports in the circumferential wall of said tubular valve operable upon opening of said end valves to establish communication between the respective inlet passages and the outlet passage, and an equalizing valve reciprocably mounted in said tubular valve provided with ports for causing the ends of the equalizing valve to be subjected to the opposing pressures of the respective fluids and provided with means cooperating with the ports in the wall of said tubular valve operable by lengthwise movement of said equalizing valve in response to the difference in the pressures of the respective fluids so to regulate the rates of flow thereof as continuously to maintain the mixture delivered from the outlet passage at a substantially uniform temperature.

8. A mixing valve for fluids under pressure having different temperatures comprising a body having inlet passages for the respective fluids and intermediate of said passages an outlet passage for the mixed fluid, a cylindrical valve casing within said body having open ends communicating with the respective inlet passages, a single manually operable main valve member adjustably mounted in said valve casing having end valves complementary to the open ends of said valve casing and having an intermediate tubular section provided with ports operable by adjustment of the tubular member to prevent or to establish regulated communication between the respective inlet passages and the outlet passage, and an equalizing valve reciprocably mounted in said tubular section provided with ports for causing the ends of the equalizing valve to be subject to the pressures of the respective fluids and having means cooperating with the respective ports in the wall of said tubular member so to proportion the rates of flow of the fluids delivered from the respective inlet passages to the outlet passage as continuously to maintain the fluids delivered from the outlet passage at a substantially uniform temperature and to prevent flow of one fluid from its inlet passage to the outlet passage upon absence of or substantial failure of pressure of the other fluid.

9. A hot and cold water mixing valve comprising a body having inlet passages respectively for hot and cold water under pressure and an outlet passage for the mixture thereof intermediate of said inlet passages, a cylindrical valve casing within said body communicating at its opposite ends with the respective inlet passages and intermediate of its ends with said outlet passage, a manually operable valve member mounted in and adjustable longitudinally of said casing having at its ends valves for closing the ends of said casing to prevent or to regulate admission of both hot and cold water into the casing and provided intermediate of its ends with a tubular section having pairs of adjacent ports communicating with the respective inlet passages and with the outlet passage, a cylindrical equalizing valve slidably mounted in said tubular section having chambers operable adjustably to establish communication between the hot water inlet port and the adjacent outlet port and between the cold water inlet port and the adjacent outlet port of said tubular section, small apertures in the respective end walls of said equalizing valve leading from said chambers to the respective end portions of said tubular section, whereby the pressures of the hot and cold water upon the respective ends of said equalizing valve will so position the chambers of said equalizing valve relatively to the respective ports in said tubular section as to maintain the water discharged from the outlet passage at a substantially uniform temperature irrespective of differences in the fluid pressures of said hot and cold water.

PAUL C. SYMMONS.